United States Patent [19]
Sloan, Jr.

[11] 4,083,209
[45] Apr. 11, 1978

[54] LOW PROFILE THREADED LOCK CAP

[75] Inventor: Paul H. Sloan, Jr., Sturgis, Mich.

[73] Assignee: Stant Manufacturing Company, Inc., Connersville, Ind.

[21] Appl. No.: 810,975

[22] Filed: Jun. 29, 1977

[51] Int. Cl.² .............................................. B65D 55/14
[52] U.S. Cl. ..................................... 70/165; 220/303; 220/210
[58] Field of Search ........................ 220/210, 203, 303; 70/165; 215/201, 204, 207, 214, 217, 218, 223

[56] References Cited
U.S. PATENT DOCUMENTS

| 4,000,632 | 1/1977 | Summan | 220/210 |
| 4,000,633 | 1/1977 | Evans | 220/210 |

*Primary Examiner*—William Price
*Assistant Examiner*—Allan N. Shoap
*Attorney, Agent, or Firm*—Jenkins, Coffey & Hyland

[57] ABSTRACT

A low-profile locking cap for a threaded filler neck includes a closure member for engaging and closing the neck, a shell providing a hand grip and including a key-actuable lock, and a race disposed for rotation between the shell and closure. The race includes axially inwardly opening pockets, and the closure includes flexible pawl fingers for engaging the pockets to provide a driving connection between the closure and race which is positive in the cap removal direction and torque-limited in the cap advancing direction. The race also includes a set of peripherally spaced, radially inwardly projecting teeth, and the shell is molded to provide a pair of flexible drive fingers for engaging the peripherally spaced and radially inwardly projecting teeth to provide a driving connection between the shell and race which is positive in the cap advancing direction and torque-limited in the cap removal direction for free ratcheting of the cap when it is in position on the filler neck and locked. A lock-controlled blocking member is movable by the lock to a cap removal position. The blocking member engages the drive fingers, when in the cap removal position, to prevent the drive fingers from flexing out of engagement with the teeth to render the engagement between the drive fingers and teeth positive in the cap removal direction.

17 Claims, 8 Drawing Figures

LOW PROFILE THREADED LOCK CAP

This invention relates to closure caps for vehicle fuel tank threaded filler necks, and particularly to a locking cap having a substantially all-plastic construction and a low axial profile.

Various types of locking gas caps for vehicle fuel tank threaded filler necks are known. See, for example, Summan, U.S. Pat. No. 4,000,632, issued Jan. 4, 1977; Evans, U.S. Pat. No. 4,000,633, issued Jan. 4, 1977; and, Evans, U.S. patent application Ser. No. 735,252, filed October 29, 1976 and assigned to the same assignee as the present invention.

It is an object of the present invention to provide a locking cap for a threaded filler neck which is simpler and easier to manufacture than these prior art devices. The apparatus of the instant invention is constucted largely of molded plastic parts, and is very rugged and sturdy.

According to the invention, the locking fuel tank filler neck cap includes a closure member for threadedly engaging and closing the neck, a shell providing a hand grip and including means for retaining a key-actuable lock and a race disposed for rotation between the shell and closure. The race includes first engaging means and the closure includes second engaging means for engaging the first engaging means to provide a driving connection between the closure and race which is positive in the cap removal direction and torque-limited in the direction which advances the cap on the neck. The race further includes a third engaging means, and the shell includes a fourth engaging means for engaging the third engaging means to provide a driving connection which is positive in the cap advancing direction and torque-limited in the cap removal direction. The cap further includes means controlled by the lock for blocking the torque-limited engagement of the third and fourth engaging means to render such engagement positive in the cap removal direction for cap removal.

In the illustrative embodiment, the first engaging means comprises at least one axially opening pocket including an inclined camming surface and a locking surface, and the second engaging means comprises at least one flexible finger on the closure, the finger being formed to provide an axially deflectable pawl having an inclined camming surface and a locking surface. The camming surfaces and flexible finger cooperate to provide the torque-limited connection between the closure and race in the cap advancing direction. The locking surfaces cooperate to provide the positive connection between the closure and race in the cap removal direction.

Further in the illustrative embodiment, the third engaging means comprises at least one radially inwardly projecting engaging tooth on a radially inwardly facing surface of the race, the tooth including an inclined camming surface and a locking surface. The fourth engaging means includes at least one flexible finger projecting into engagement with the tooth, the finger including a camming surface and a locking surface. The camming surfaces of the tooth and finger and the flexibility of the finger cooperate to provide the torque-limited connection between the race and shell in the cap removal direction and the locking surfaces thereof cooperate to provide the positive connection between the race and shell in the cap advancing direction. The finger of the fourth engaging means includes a blocking region. The blocking means is key-actuated to move into blocking engagement with the blocking region to prevent flexing of the fourth engaging means finger to overcome the torque-limiting function of the third and fourth engaging means, thereby rendering the engagement between the race and shell positive in the cap removal direction.

The instant structure permits a low axial profile for the threaded fuel tank filler neck cap. This cap requires less space for the apparatus required to operate the unlocking and cap removal mechanism. The shell includes a portion which is integrally and unitarily molded with flexible fingers forming a part of the unlocking mechanism. Thus, it is not necessary with the cap of the instant invention to assemble a number of relatively small, interacting cap locking and unlocking parts. One of the basic problems with many prior art caps is that the unlocking apparatus of such caps includes a number of small coacting parts. Much of the cap of the instant invention can be constructed from molded plastic. A distinct advantage of this construction is that such parts can be made quite inexpensively in two-part molds.

The invention may best be understood by referring to the following detailed description and accompanying drawings which illustrate the invention. In the drawings.

Figure 1:
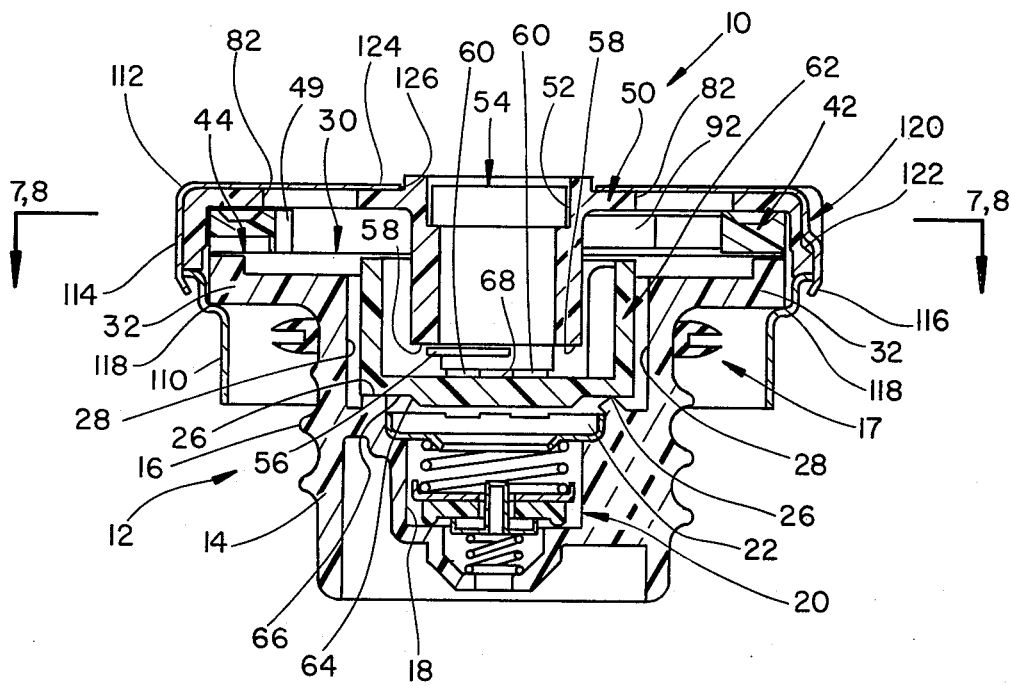
FIG. 1 is a partly sectional side elevational view of a threaded locking gas cap constructed according to the present invention.

Referring now particularly to FIG. 1, the locking cap 10 includes a molded plastic closure member 12 having an axially inwardly extending shank portion 14 which is threaded as indicated at 16 to engage a threaded filler neck (not shown). Closure 12 includes a gasket 17 which sealably engages the conventional peripherally and radially outwardly extending lip provided by the filler neck. Closure 12 further includes a pressure-vacuum vent valve housing 18 into which is assembled a pressure-vacuum vent valve assembly 20. Assembly 20 controls venting of pressure and vacuum which develop within the fuel tank in a manner which is well-known. The valve assembly 20 is retained within housing 18 by a cover plate 22 which is press fit into the axially outer end 24 of housing 18. Closure member 12 further includes a segmented, circular supporting wall 26 (see FIG. 2) axially outwardly from housing 18. A generally cylindrical region 28 is defined within the axially outer end 30 of closure 12. Finally, closure 12 includes a flange 32 at its axially outer end. Flange 32 extends radially outwardly of the axis of closure 12, and includes four peripherally extending resilient fingers 34

Figure 2:
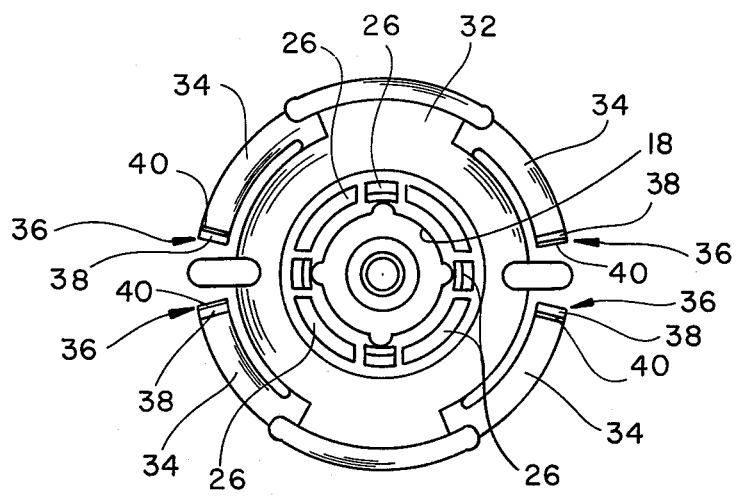
FIG. 2 is a top plan view of a detail of the cap of FIG. 1.

(see FIG. 2). Fingers 34 are attached at their proximal ends to flange 32, and are provided at their distal ends with pawl teeth 36. Each tooth 36 has an inclined camming surface 38 and a radially and generally axially extending locking surface 40. The purpose of these surfaces will be discussed in greater detail hereinafter.

Figure 3:
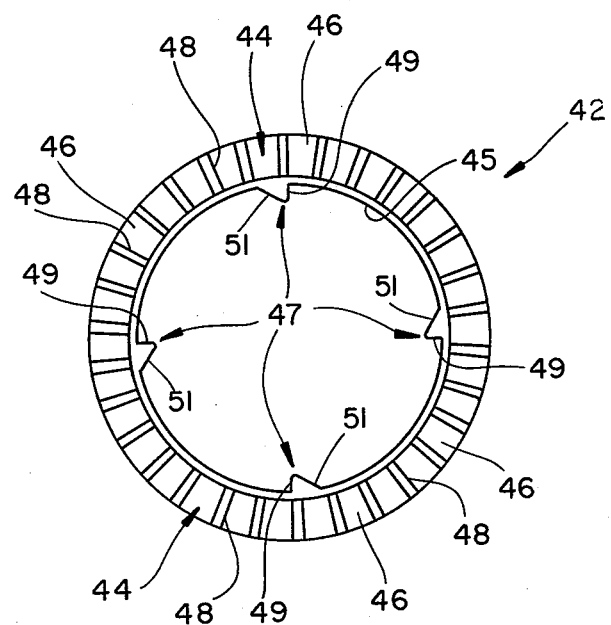
FIG. 3 is a bottom plan view of a detail of the cap of FIG. 1.

Cap 10 further includes an annular race 42 (see FIG. 3) which is disposed for rotation within the cap. As can be seen from FIG. 1, race 42 lies directly axially outwardly from flange 32. Race 42 includes a set of peripherally spaced apart, axially inwardly opening pockets 44 (see FIG. 3). Each of pockets 44 includes an inclined camming surface 46, and a radially and axially extending, abrupt locking surface 48. Surfaces 38, 46 of teeth 36 and pockets 44, respectively, cooperate to provide a torque-overriding connection of race 42 to closure 12 in the direction (counterclockwise in FIG. 3) which advances closure 12 into the fuel tank filler neck. Surfaces 40, 48 of teeth 36 and pockets 44, respectively, cooperate to provide the direct connection of race 42 to closure 12 in the direction (clockwise in FIG. 3) which removes closure 12 from the filler neck.

Race 42 also includes a radially inwardly facing, peripherally extending surface 45 which is provided with four radially inwardly extending projections 47. Each projection 47 includes an abrupt radially and axially extending driving face 49, and an inclined camming surface 51.

Cap 10 further includes a molded plastic shell member 50 (see FIG. 1) secured to closure member 12 for rotation with respect to the closure member about the axis of cap 10. Race 42 is captured in an annular space provided between shell member 50 and closure 12. Shell member 50 is provided with a concentric opening 52 to accommodate a cylinder lock assembly 54. The cylinder lock assembly 54 is retained within shell member 50 by a locking lug 56 which projects radially outwardly from assembly 54 near its axially inner end to engage an axially inwardly extending cylindrical wall portion 58 of shell member 50. Lock assembly 54 includes a pair of axially extending drive pins 60 which project from the axially inner end of the lock assembly, and which are actuated by turning of the key (not shown) in the lock assembly 54 to turn counterclockwise when viewed from above to condition the cap 10 for removal from the filler neck.

Figure 4:
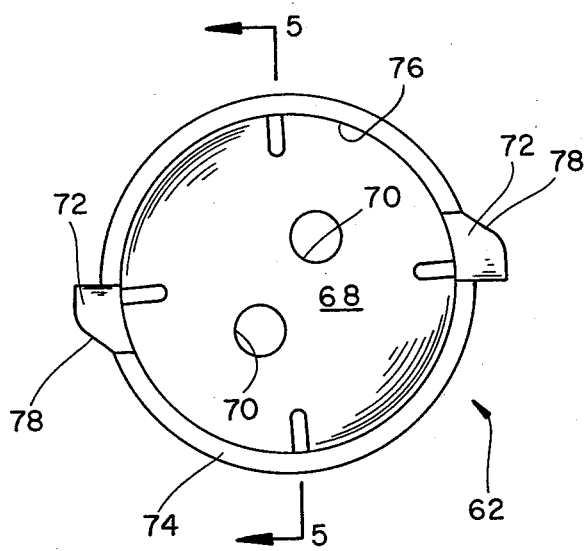
FIG. 4 is a top plan view of a detail of the cap of FIG. 1.
Figure 5:
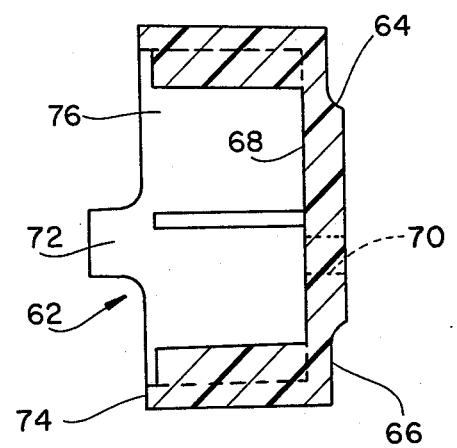
FIG. 5 is a sectional side elevational view of the detail of FIG. 4, taken along section lines 5—5 thereof.

Cap 10 further includes a locking bolt mechanism or "blocking" member 62, which is best illustrated in FIGS. 4-5. Blocking member 62 is generally cup-shaped, and includes an axially inwardly extending projection 64 of the bottom surface 66 thereof. Projection 64 extends into the axially outer end of housing 18. The bottom 68 of member 62 is provided with a pair of holes 70 through which drive pins 60 of lock assembly 54 extend. Member 62 rests upon supporting wall 26 within cylindrical portion 28 of closure 12. Actuation of pins 60 of lock assembly 54 rotates member 62. Member 62 includes a pair of diametrically opposed blocking projections or "ears" 72 at the axially outer end or "lip" 74 of the generally cylindrical wall 76 thereof. Ears 72 include radially outwardly facing blocking surfaces 78 which cooperate with shell member 50 in a manner which will now be described to provide for cap 10 removal from the filler neck when the lock assembly 54 is in a cap removal position.

Figure 6:
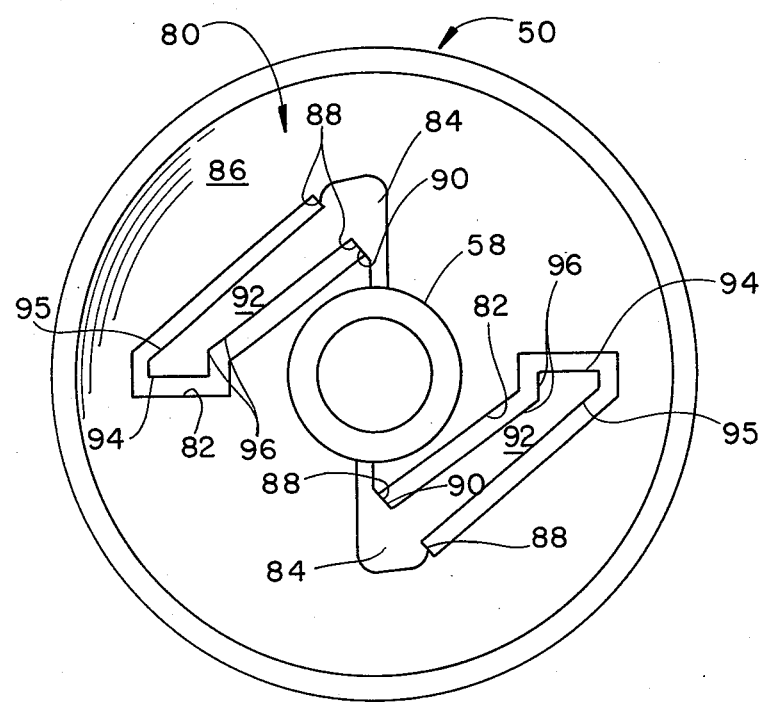
FIG. 6 is a top plan view of a detail of the cap of FIG. 1.

Referring now to FIG. 6, a bottom plan view of shell member 50, it will be seen that the outer end 80 of shell member 50 is provided with a pair of windows 82. Windows 82 extend axially through the outer end 80 of shell member 50. A pair of axially inwardly extending projections 84 are molded on the axially inner surface 86 of end 80. Projections 84 extend radially outwardly from wall portion 58, and are substantially diametrically opposed. Axially extending surfaces 88 of projections 84 are coterminous with end edges 90 of windows 82. A pair of resilient drive fingers 92 are molded onto surface 88 within windows 82. Fingers 92 extend generally along chords of a circle defined by shell member 50. Windows 82 enable fingers 92 to be molded in a simple, two-part mold. Fingers 92 include axially extending, radially outwardly facing engaging surfaces 94 and camming surfaces 95 at their distal ends. Fingers 92 also include radially inwardly facing, axially extending blocking surfaces 96.

Figure 7:
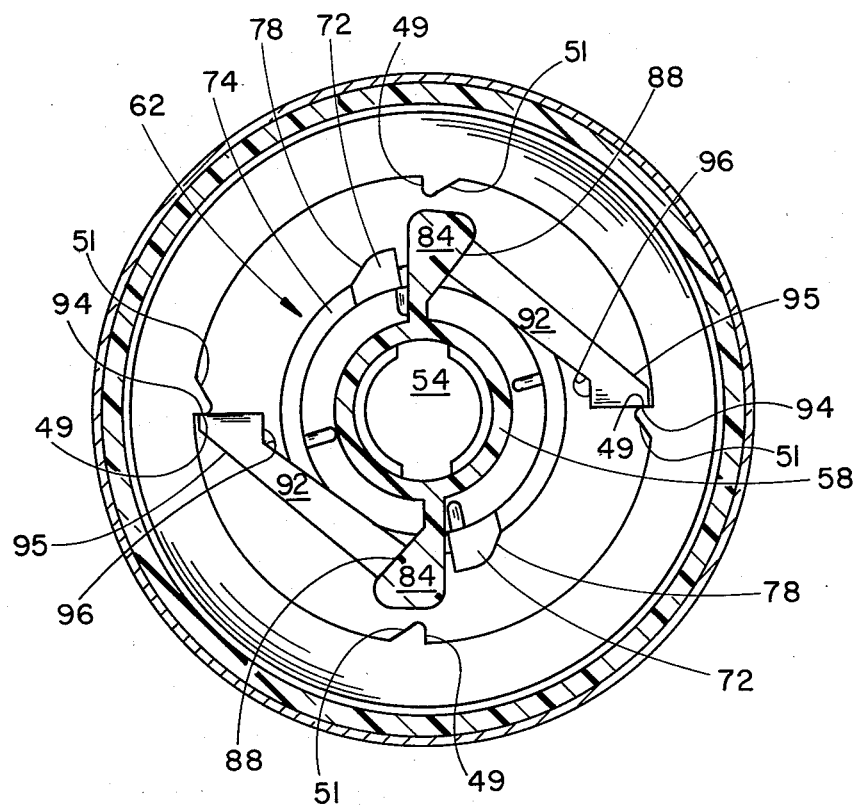
FIG. 7 is a sectional view of the cap of FIG. 1, taken generally along section lines 7,8—7,8 thereof, with the lock apparatus of the cap in a locking position; and, FIG. 8 is a sectional view of the cap of FIG. 1, taken generally along section lines 7,8—7,8 thereof, with the lock mechanism in an unlocking, or cap removal position.
Figure 8:
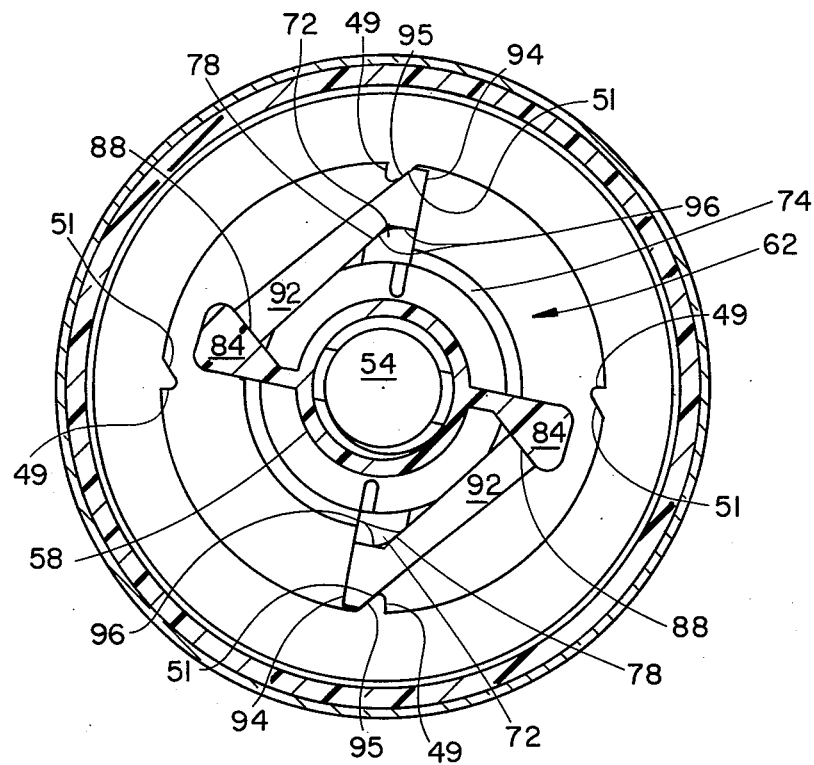

Turning now to FIGS. 7-8, the operation of cap 10 will be explained. FIG. 7 is a sectional view of a portion of the cap, with member 62 in the cap locking position. When cap 10 is rotated in a closure advancing direction (clockwise in FIG. 7) the engaging surfaces 94 of drive fingers 92 engage the driving faces 49 of projections 47 on race 42. This provides a driving connection between shell member 50 and race 42. The engagement of inclined camming surfaces 38 of teeth 36 on closure 12 with the inclined camming surfaces 46 of race 42 provides a torque-limited connection between race 42 and closure 12 in this cap advancing direction. When closure 12 is advanced into the filler neck a sufficient distance that the filler neck is closed and gasket 17 is compressed, the limiting torque in the cap advancing direction is reached. Then, fingers 34 flex axially inwardly due to the engagement of surfaces 38, 46, causing the race 42 to ratchet, thereby preventing the limiting torque from being exceeded and gasket 17 from being damaged.

It can be seen that when blocking member 62 is in its locking position, illustrated in FIG. 7, and shell member 50 is turned in the cap removal direction (counterclockwise), camming surfaces 95 of fingers 92 are urged against camming surfaces 51 of projections 47 on race 42. The compression of gasket 17 and the flexibility of fingers 92 are such that fingers 92 are deflected radially inwardly by camming surfaces 51, and override projections 47 to prevent cap removal.

Referring now to FIG. 8, blocking member 62 is pictured in its cap removal position. In this position, pins 60 have been actuated by a key (not shown) to move ears 72 into positions such that their blocking surfaces 78 engage the blocking surfaces 96 on drive fingers 92. Such engagement blocks the radially inwardly flexure of fingers 92 as the shell member 50 is rotated in the cap removal (counterclockwise) direction. Thus, camming surfaces 95 of fingers 92 are blocked from radially inward camming against surfaces 51 of projections 47 on race 42, and cap 10 can be removed from the filler neck by counterclockwise rotation of shell member 50.

Closure 12, race 42 and shell member 50 are held in relatively rotatable engagement by a retainer ring 110 (of FIG. 1) and shell cover 112. Ring 110 and shell cover 112 are both constructed from stamped sheet metal, with a depending skirt portion 114 of shell cover 112 being crimped as at 116 to hold ring 110 axially outwardly against the axially inner surface 118 of flange 32. A plurality of radial and axial indentations 120 are stamped into shell cover 112. These indentations 120 correspond in their peripheral locations with a plurality of similar indentations 122 which are molded into shell member 50. Engagement of indentations 120, 122 prevents rotation of shell cover 112 with respect to shell member 50. The axially outer face 124 of shell cover 112 is provided with a central circular aperture 126 through which access is provided to the lock assembly 54. Otherwise, shell cover 112 is solid so that fingers 92 are not visible through windows 82 in shell member 50.

There is thus provided a low-profile locking cap for a threaded filler neck. The cap includes a closure member for engaging and closing the neck, a shell providing a hand grip and including a key-actuable lock, and a race disposed for rotation between the shell and closure. The race cooperates with the closure member to provide a positive connection in the cap removal direction and a torque-limited connection in the cap advancing direction. The race further includes radially inwardly opening pockets, and the shell includes a molded plastic shell portion providing a pair of flexible drive fingers for engaging the radially inwardly opening pockets on the race to provide a positive connection in the cap advancing direction and a torque-limited connection in the cap removal direction. The cap further includes a lock-controlled blocking member which, when the lock is in the cap removal position, blocks flexing of the drive fingers to render the engagement between the shell and race positive in the cap removal direction, thereby allowing the cap to be removed from the filler neck. The flexible fingers are mounted at generally diametrically opposed points on a lock hub provided on the shell portion. The fingers extend generally along chords of a circle defined by the shell portion and terminate at generally diametrically opposed points on the shell portion. The shell portion includes means defining a pair of windows, the windows being located axially outwardly from the flexible fingers to provide a structure which can be readily formed in a two-part mold.

A cap 10 constructed in accordance with the instant invention included drive fingers 92 designed so as not to create more than 0.1 newton-meter torque when rotated in a cap removal direction with the lock in the cap-locking position. The limiting torque between teeth 36 and race 42 of that cap in the cap advancing direction was between 1.0 and 2.0 newton-meters.

It should be understood that the arms 92 project from surfaces 88 generally perpendicularly thereto and are shaped for uniform strength throughout their length. When fingers 92 are in engagement with surfaces 49 of teeth 47, this configuration provides for high compressive loading of drive fingers 92 when the cap is rotated to advance the closure into the filler neck.

When the cap is in the locked condition and the shell member 50 is rotated in the cap removal direction, each of drive fingers 92 acts as a cantilever beam. Low loading causes drive fingers 92 to flex readily when shell member 50 is rotated in the cap removal direction.

When the blocking member 62 is in its cap removal position, and the blocking surfaces 78 of ears 72 engage the blocking surfaces 96 of drive fingers 92, some flexing of drive fingers 92 occurs. This flexing as camming surfaces 95 are urged against surfaces 51 of race 42 causes the blocking surfaces 96 to capture surfaces 78 to prevent ears 72 from "backing out" of engagement with surfaces 96. Surfaces 78 are curved, as best illustrated in FIG. 8, to enhance this capturing characteristic of surfaces 78, 96.

What is claimed is:

1. A locking cap for a threaded filler neck comprising in combination, a threaded closure member for engaging and closing the neck, a key actuable lock, a shell providing a hand grip and including means for retaining said lock, an annular race disposed for rotation between the shell and closure, the race including first engaging means and the closure including second engaging means for engaging the first engaging means to provide a driving connection between the closure and race which is positive in the cap removal direction and torque-limited in the cap advancing direction, the race further including third engaging means, the shell including fourth engaging means for engaging the third engaging means to provide a driving connection between the third and fourth engaging means which is positive in the cap advancing direction and torque-limited in the cap removal direction, the cap further including means controlled by the lock for blocking the torque-limited engagement of the third and fourth engaging means to render such engagement positive in the cap removal direction for cap removal.

2. The cap of claim 1 wherein the third engaging means comprises at least one radially inwardly projecting engaging tooth on a radially inwardly facing surface of the race, the tooth including an inclined camming surface and a locking surface, the shell comprises a molded plastic shell portion, and the fourth engaging means includes at least one flexible finger integrally and unitarily molded to the shell portion for projecting into engagement with the tooth, the finger including a camming surface and a locking surface, the camming surfaces of the tooth and finger and the flexibility of the finger cooperating to provide the torque-limited connection between the race and shell in the cap removal direction and the locking surfaces thereof cooperating to provide the positive connection between the race and shell in the cap advancing direction.

3. The cap of claim 2 wherein the finger includes a blocking region and the blocking means is key-actuated to move into blocking engagement with the blocking region to prevent flexing of the finger to overcome the torque-limiting function of the third and fourth engaging means thereby rendering the engagement between the race and shell positive in the cap removal direction.

4. In a locking cap for a fuel tank threaded filler neck, the cap including a gasket subject to damage due to overtightening of the cap on the neck, a lock for controlling cap removal, a shell providing a hand grip, a threaded closure for engaging the filler neck to close it, and first and second engaging means providing a torque-limited connection between the shell and the closure in a direction to advance the cap into the closure to protect the gasket, the improvement comprising third engaging means positively drivingly connected to the closure in the cap removal direction and fourth engaging means connected to the shell, the third and fourth engaging means positively engaging one another in the cap advancing direction and cooperating to provide a torque-limited connection in the cap removal direction, and lock actuated means for blocking the torque-limited connection between the third and fourth engaging means in the cap removal direction to provide a positive driving connection between the closure and shell in the cap removal direction.

5. The locking cap of claim 4 wherein the first and third engaging means are provided on a race, the race being disposed for rotation between the shell and closure.

6. The cap of claim 5 wherein the third engaging means comprises at least one radially inwardly projecting engaging tooth formed on a radially inwardly facing surface of the race, the tooth including an inclined camming surface and a locking surface, the shell includes a molded plastic shell portion, and the fourth engaging means includes at least one flexible finger integrally and unitarily formed on said molded plastic shell portion, the finger projecting into engagement with the tooth, the finger including a camming surface and a locking surface, the camming surfaces of the tooth and finger and the flexibility of the finger cooperating to provide the torque-limited connection between the race and shell in the cap removal direction and the locking surfaces thereof cooperating to provide the positive connection between the race and shell in the cap advancing direction.

7. The cap of claim 6 wherein the finger includes a blocking region and the blocking means includes a key-actuated cup-shaped member having an axially outer lip and a projection on the outer lip, actuation of the cup-shaped member moving the projection into blocking engagement with the blocking region of the finger to prevent flexing of the finger to overcome the torque-limiting function of the third and fourth engaging means thereby rendering the engagement between the race and shell positive in the cap removal direction.

8. A low profile locking cap for a threaded filler neck comprising a closure member for engaging and closing the neck, a shell providing a hand grip and including a lock, and means providing a positive connection between the shell and closure in the cap removal direction and a torque-limited connection between the shell and closure in the cap advancing direction, the cap further including engaging means and the shell including a shell portion for providing at least one flexible drive finger for engaging the engaging means to provide a positive connection in the cap advancing direction and a torque-limited connection in the cap removal direction, the cap further including a lock-controlled member for blocking flexing of the drive finger to render the engagement between the drive finger and engaging means positive in the cap removal direction.

9. The cap of claim 8 wherein the engaging means comprises a plurality of radially inwardly opening, peripherally extending pockets.

10. The cap of claim 8 wherein said shell portion is formed from molded plastic.

11. The cap of claim 8 wherein there are a pair of such flexible drive fingers, the fingers being mounted at generally diametrically opposed points on the shell portion, the fingers extending generally along chords of a circle defined by said shell portion and terminating at generally diametrically opposed points on the shell portion.

12. The cap of claim 8 wherein the shell portion includes means defining a window, the window being located axially outwardly from the drive finger.

13. A low profile locking cap for a threaded filler neck comprising a closure member for engaging and closing the neck, a shell providing a hand grip and including a lock, and a race disposed for rotation between the shell and closure, the race cooperating with the closure member to provide a positive connection in the cap removal direction and a torque-limited connection in the cap advancing direction, the race further including engaging means and the shell including a shell portion for providing at least one flexible drive finger for engaging the engaging means on the race to provide a positive connection in the cap advancing direction and a torque-limited connection in the cap removal direction, the cap further including a lock-controlled member for blocking flexing of the drive finger to render the engagement between the shell and race positive in the cap removal direction.

14. The cap of claim 13 wherein the engaging means on the race comprises a plurality of radially inwardly opening, peripherally extending pockets.

15. The cap of claim 13 wherein said shell portion is formed from molded plastic.

16. The cap of claim 13 wherein there are a pair of such flexible drive fingers, the fingers being mounted at generally diametrically opposed points on the shell portion, the fingers extending generally along chords of a circle defined by said shell portion and terminating at generally diametrically opposed points on the shell portion.

17. The cap of claim 16 wherein the shell portion includes means defining a pair of windows, the windows being located axially outwardly from the drive fingers.

* * * * *

UNITED STATES PATENT OFFICE
CERTIFICATE OF CORRECTION

Patent No. 4,083,209      Dated April 11, 1978

Inventor(s) Paul H. Sloan, Jr.

It is certified that error appears in the above-identified patent and that said Letters Patent are hereby corrected as shown below:

Column 6, line 52, cancel "clo-" and substitute -- filler --; line 53, cancel "sure" and substitute -- neck --.

Signed and Sealed this

Twenty-sixth Day of September 1978

[SEAL]

Attest:

RUTH C. MASON
Attesting Officer

DONALD W. BANNER
Commissioner of Patents and Trademarks